US011093432B1

(12) United States Patent
Vijayrao et al.

(10) Patent No.: US 11,093,432 B1
(45) Date of Patent: *Aug. 17, 2021

(54) MULTI-CHANNEL DIMMS

(71) Applicant: Facebook, Inc., Menlo Park, CA (US)

(72) Inventors: Narsing Vijayrao, Santa Clara, CA (US); Jay Parikh, San Ramon, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,163

(22) Filed: May 13, 2020

Related U.S. Application Data

(63) Continuation of application No. 15/594,500, filed on May 12, 2017, now Pat. No. 10,684,980.

(51) Int. Cl.
*G06F 13/42* (2006.01)
*G06F 5/12* (2006.01)
*G06F 13/16* (2006.01)

(52) U.S. Cl.
CPC ............ *G06F 13/4234* (2013.01); *G06F 5/12* (2013.01); *G06F 13/1673* (2013.01)

(58) Field of Classification Search
None
See application file for complete search history.

(56) References Cited

U.S. PATENT DOCUMENTS

| 10,684,980 B2 | 6/2020 | Vijayrao et al. |
| 2010/0036997 A1 | 2/2010 | Brewer et al. |
| 2011/0296068 A1 | 12/2011 | Fredenberg et al. |
| 2012/0221771 A1 | 8/2012 | Yoon et al. |

OTHER PUBLICATIONS

Non-Final Office Action received for U.S. Appl. No. 15/594,500 dated Jul. 2, 2018, 20 pages.
Final Office Action received for U.S. Appl. No. 15/594,500 dated Jan. 28, 2019, 21 pages.
Non-Final Office Action received for U.S. Appl. No. 15/594,500 dated Oct. 1, 2019, 37 pages.
Notice of Allowance received for U.S. Appl. No. 15/594,500 dated Feb. 11, 2020, 40 pages.

*Primary Examiner* — Idriss N Alrobaye
*Assistant Examiner* — Dayton Lewis-Taylor
(74) *Attorney, Agent, or Firm* — FisherBroyles, LLP

(57) ABSTRACT

A system and method for multi-channel communication with dual in-line memory modules ("DIMMs") is disclosed. The system retrieves information characterizing a plurality of memory channels, each of each is configurable to facilitate data communication between a DIMM and a memory controller with associated memory channel interfaces. Based on the retrieved information, one of the memory channels is designated as the active memory channel, granting the designated memory channel the ability to issue memory requests or transactions to the DIMM. On a periodic or as-needed basis (e.g., when the active memory channel is stalled or nearly stalled), the system determines whether to designate a different of the memory channels as the active memory channel, thereby enabling the newly-designated active memory channel the ability to issue memory requests or transactions to the DIMM. In some embodiments, only one of the memory channels is active at a time for communication with each DIMM.

20 Claims, 8 Drawing Sheets

MULTI-CHANNEL DIMMS

CROSS REFERENCE TO RELATED APPLICATION

This application is a continuation of U.S. application Ser. No. 15/594,500, filed 12 May 2017, the disclosure of which is incorporated, in its entirety, by this reference.

BACKGROUND

In a computing system, a central processing unit ("CPU") communicates with the memory modules, e.g., dual in-line memory modules ("DIMMs"), which provide system memory for the computing system, over memory channels. Each memory channel may be implemented as a data and control bus that communicatively couples a DIMM socket on the computing system motherboard (alternatively referred to as the mainboard or system board) to a memory controller integrated with or in communication with the CPU. The memory controller interface, furthermore, may support multiple memory channels, each of which may communicate with the memory controller concurrently. Each DIMM socket, however, typically communicates with the memory controller via a single memory channel. When a DIMM is active in the computing system, it communicates with the memory controller and CPU via the single memory channel corresponding to the DIMM socket in which the DIMM is installed.

Within a computing system, overall memory bandwidth between the CPU and system memory is based on the combined bandwidth of the utilized memory channels. The memory bandwidth of a channel, meanwhile, is based on the data "width" of the channel and the frequency with which data may be transmitted over the channel. While the bandwidth of individual memory channels, and thus the overall memory bandwidth of the computing system, can be improved (e.g., by increasing the frequency of the channel), the ability to improve the bandwidth of individual memory channels is limited (for example, memory can only operate up to particular frequencies before the memory ceases to function properly). As a result, improvements in the overall memory bandwidth of a system are typically achieved by utilizing more of the memory channels available in the system. That is, for example, by moving from the utilization of one memory channel to two memory channels in a computing system, the computing system is expected to achieve a 2X increase in overall memory bandwidth. Because each DIMM only communicates over a single memory channel, however, increasing system memory bandwidth by utilizing more memory channels necessitates adding additional DIMMs to the computing system.

There are various shortcoming that arise from using additionally installed DIMMs to improve a system's overall memory bandwidth. For example, each DIMM costs money, thereby increasing the cost of the computing system. The continued use of each additional DIMM may also contribute to other shortcomings, such as greater power consumption and increased cooling needs. Furthermore, each additional DIMM creates an additional point of failure during the operation of the computing system. And in many cases, due to increases in DIMM capacity, the additional memory provided by the additional DIMMs are not necessary for the system, and therefore do not offset the noted shortcomings. It would therefore be beneficial to improve the overall memory bandwidth of a computing system without requiring the utilization of additional DIMMs in the system.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
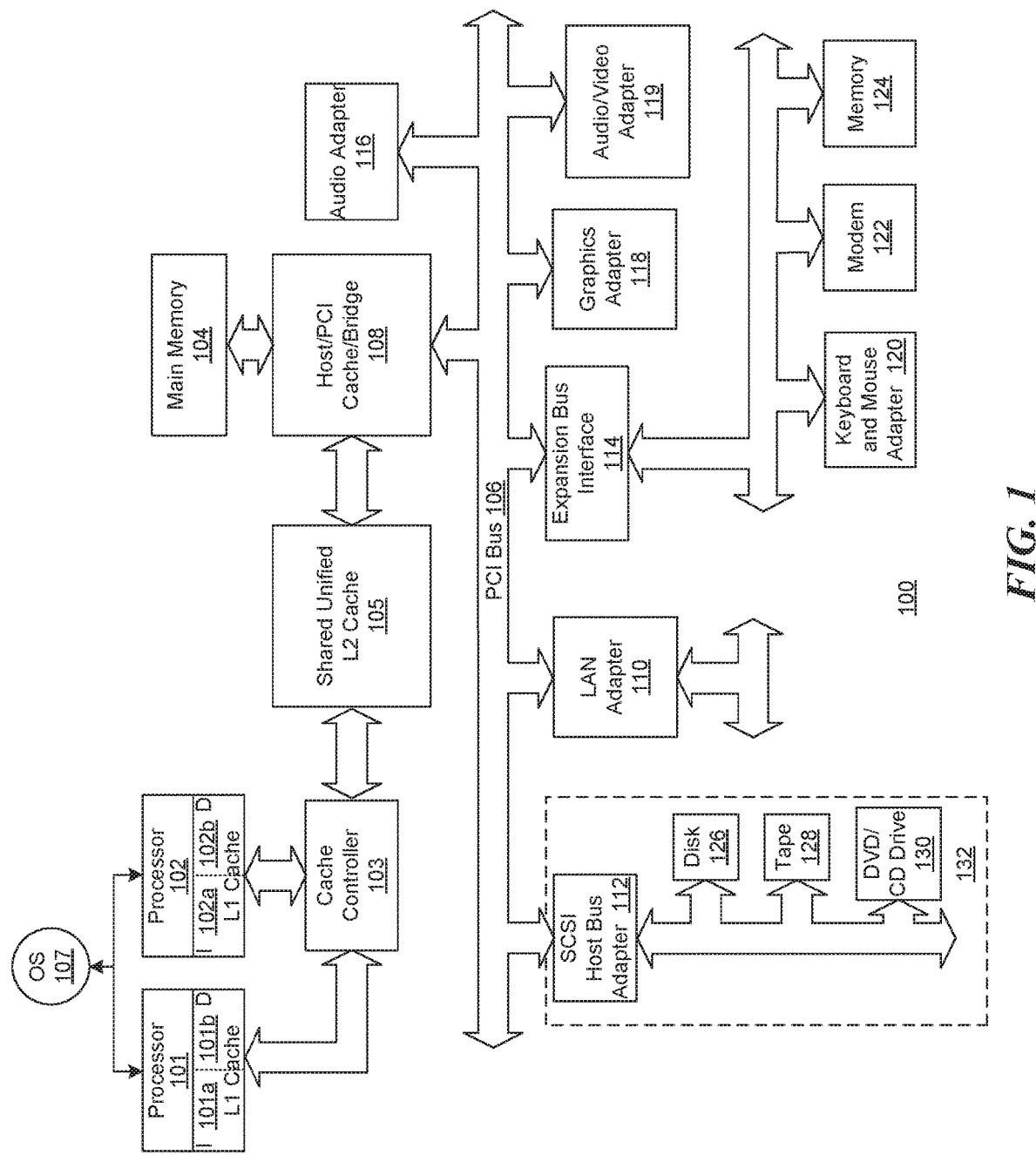
FIG. 1 is a block diagram illustrating a brief, general description of a representative environment in which the various embodiments can be implemented.

Embodiments for improving overall memory bandwidth in a computing system, by increasing the number of memory channels used in the computing system without the use of additional DIMMs, are described herein. In various embodiments of a multi-channel DIMM system, DIMMs installed in the system are each communicatively coupled to a memory controller through multiple memory channels. As described herein, the system can utilize a second memory channel to transfer data with a DIMM when that DIMM would otherwise be unable to transfer data via a first memory channel, thereby increasing the utilized overall memory bandwidth of the system. In other words, the multi-channel DIMM system enables individual DIMMs to opportunistically communicate with a memory controller over one of multiple memory channels, which improves overall memory bandwidth over systems in which each DIMM can only communicate with the memory controller over a single memory channel (which, as described below, can lead to underutilization of the DIMM).

In various embodiments of the multi-channel DIMM system, an installed DIMM can communicate with the system memory controller over multiple memory channels simultaneously, thereby providing overall system bandwidth equivalent to multiple DIMMs each supporting a single memory channel in a conventional system. In various embodiments of the system, an installed DIMM can communicate with the system memory controller over only one of the multiple memory channels at a time. This enables the system to opportunistically utilize different memory channels for the DIMM, thereby avoiding underutilization of the DIMM that can arise in conventional systems.

In various embodiments, the system selects for each memory transaction (e.g., a read or write operation to a DIMM) which of the multiple memory channels coupled to the DIMM to use for that transaction. The selection may be made, for example, based on observed or predicted memory controller stalls on one of the multiple memory channels coupled to the DIMM, or based on observed or predicted memory access patterns. The selection may be made, for example, by kernel-level code of an operating system running on the system, by firmware code executed by the CPU, memory controller, or other system component, or by dedicated hardware logic of the memory controller. By determining which memory channel to use on a per-transaction or per-cycle basis, at a level close to the memory hardware, the system can effectively utilize the multiple memory channels available to a DIMM in response to detected conditions.

Although various embodiments of the disclosed system are described with reference to using dual in-line memory modules (i.e., "DIMMs"), it will be appreciated that in various embodiments other memory modules, memory form factors, or types of storage may be used. For example, the disclosed system may be used with small outline dual in-line memory modules ("SO-DIMMs"), memory utilizing surface-mount technology ("SMT"), etc.

Suitable Environments

Various examples of the techniques introduced above will now be described in further detail. The following description provides specific details for a thorough understanding and enabling description of these examples, One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

Turning now to the figures, FIG. 1 is a block diagram illustrating a data processing system 100 in which the various embodiments may be implemented. The data processing system 100 employs a multi-processor central processing unit ("CPU") containing processor cores 101 and 102 and peripheral component interconnect (PCI) local bus architecture. In this particular configuration, each processor core includes a processor and an L1 cache, where each L1 cache consists of an instruction cache 101 *a* and 102 *a*, and a data cache 101 *b* and 102 *b*. Further, the two processor cores share a unified L2 cache 105 and a cache controller 103 controls the two processor cores' access (e.g., to read and write data) to the shared unified L2 cache 105.

In some embodiments, the cache controller 103 further partitions the shared unified L2 cache 105 and controls the access to the various partitions. A cache is said to be "unified" if the cache can be used to store executable instructions or data in any given cache block (a basic unit of storage in cache), which is also referred to as a cache line. Further, the term "unified", as used to describe a cache, does not describe or imply a physical characteristic of a given cache. A "unified" cache memory can include a single physical memory device or could include multiple physical memory devices. The L2 cache in the data processing system 100 constitutes a Last Level Cache ("LLC") that acts as an intermediary between the main (system) memory 104 and previous caches, e.g., the L1 caches. However, it should be understood that other configurations are possible in various embodiments. As an example, an L3 cache (not illustrated) may instead be an LLC that acts as an intermediary between the main memory 104 and an L2 cache.

The L2 cache 105 is connected to main memory 104 and PCI local bus 106 through a PCI bridge 108. PCI bridge 108 also may include an integrated memory controller and additional cache memory for processors 101 and 102. Though not illustrated, the integrated memory controller may provide multiple memory channels through which to communicate with main memory 104. Communication between the main memory 104 and integrated memory controller may occur concurrently via the multiple memory channels. Additional connections to PCI local bus 106 may be made through direct component interconnection or through add-in boards. In the illustrated system, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots.

Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM/DVD drive 130. Typical PCI local bus implementations will support three or four PCI expansion slots or add-in connectors. Note that although the depicted example employs a PCI bus, other bus architectures such as Accelerated Graphics Port (AGP) and Industry Standard Architecture (ISA) may be used.

An operating system ("OS") 107 executes on processors 101 and/or 102 and is used to coordinate and provide control of various components within data processing system 100 in FIG. 1. The OS 107 may be any conventional or special-purpose operating system, e.g., MICROSOFT WINDOWS, LINUX, UNIX, etc. An object oriented programming system (e.g., JAVA) may execute in conjunction with the operating system and provide an application program interface (API) to the operating system for Java programs or applications executing on data processing system 100. Instructions for the operating system, the object-oriented programming system, and applications or programs are located on storage devices, e.g., hard disk drive 126, and may be loaded into main memory 104 for execution by processors 101 and 102.

Note that for purpose of simplification the term "processor" or "CPU" will be used to refer to one or more processor cores on a single integrated circuit die and the term "processors" or "CPUs" will be used to refer to two or more processor cores one or more integrated circuit dies. Note further that various components illustrated in FIG. 1, such as cache controller 103, L2 cache 105, and PCI bridge 108 with integrated memory controller, may be integrated into the single integrated circuit die of the processor or processors.

Those of ordinary skill in the art will appreciate that the hardware in FIG. 1 may vary depending on the implementation. For example, other internal hardware or peripheral devices, such as flash ROM (or equivalent nonvolatile memory) or optical disk drives and the like, may be used in addition to or in place of the hardware illustrated in FIG. 1. Thus, the system illustrated in FIG. 1 and described above are not meant to imply architectural limitations.

Illustrations of Known DIMM Topologies and Operation

Figure 2:
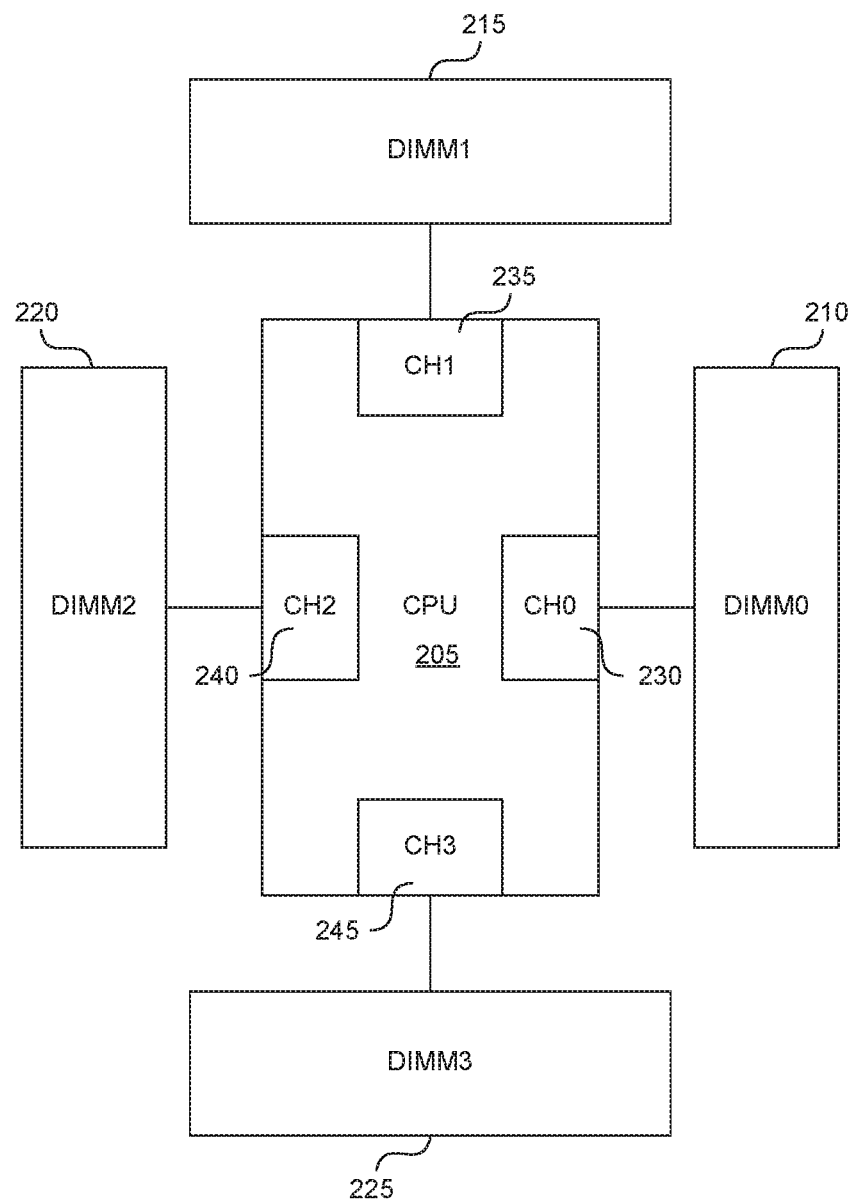
FIG. 2 is a bock diagram illustrating a computing system memory topology in which a CPU utilizes multiple memory channels, each of which facilitates communication with a single DIMM.

FIG. 2 is a block diagram illustrating a computing system memory topology 200. The computing system includes a CPU 205 with integrated memory controller. That is, the processor and memory controller are integrated onto the same integrated circuit die, with interfaces for communicating with off-die system memory. System memory is provided by dynamic random access memory ("DRAM") integrated circuits (not shown) mounted on dual in-line memory modules ("DIMMs") 210, 215, 220, and 225, which are installed into DIMM sockets (not shown) on the computing system motherboard. Each DIMM stores a portion of the available system memory, and is accessible to the CPU, via the integrated memory controller, over a memory channel. Each DIMM utilizes the memory channel associated with the DIMM socket into which the DIMM is installed. As illustrated, the integrated memory controller supports four memory channels 230, 235, 240, and 245. Each memory channel operates independently of one another and can complete transactions concurrently. That is, following the example topology illustrated in FIG. 2, memory channel CH0 230 can write data to an address stored in DIMM0 210, while memory channel CH1 235 can read data from an address stored in DIMM1 215, memory channel CH2 240 may be idle (e.g., no commands have been issued for addresses stored in DIMM3 220), and memory channel CH3 245 may be stalled. For example, a memory channel may stall when storage used to facilitate communication over the channel (e.g., input and output buffers for the channel) are full. Though FIG. 2 illustrates a topology that includes four DIMMs and four memory channels, it will be appreciated that different numbers of memory channels and DIMMs may be used (for example, one channel and two DIMMs, or three channels and five DIMMs). However, in the computing system memory topology 200, which does not illustrate the multi-channel DIMM system, each DIMM is coupled to the integrated memory controller through a single memory channel. That is, while each memory channel may be used to communicate with multiple DIMMs (not shown), a particular DIMM will only communicate via the single memory channel associated with the DIMM socket into which the DIMM is installed.

Figure 3:
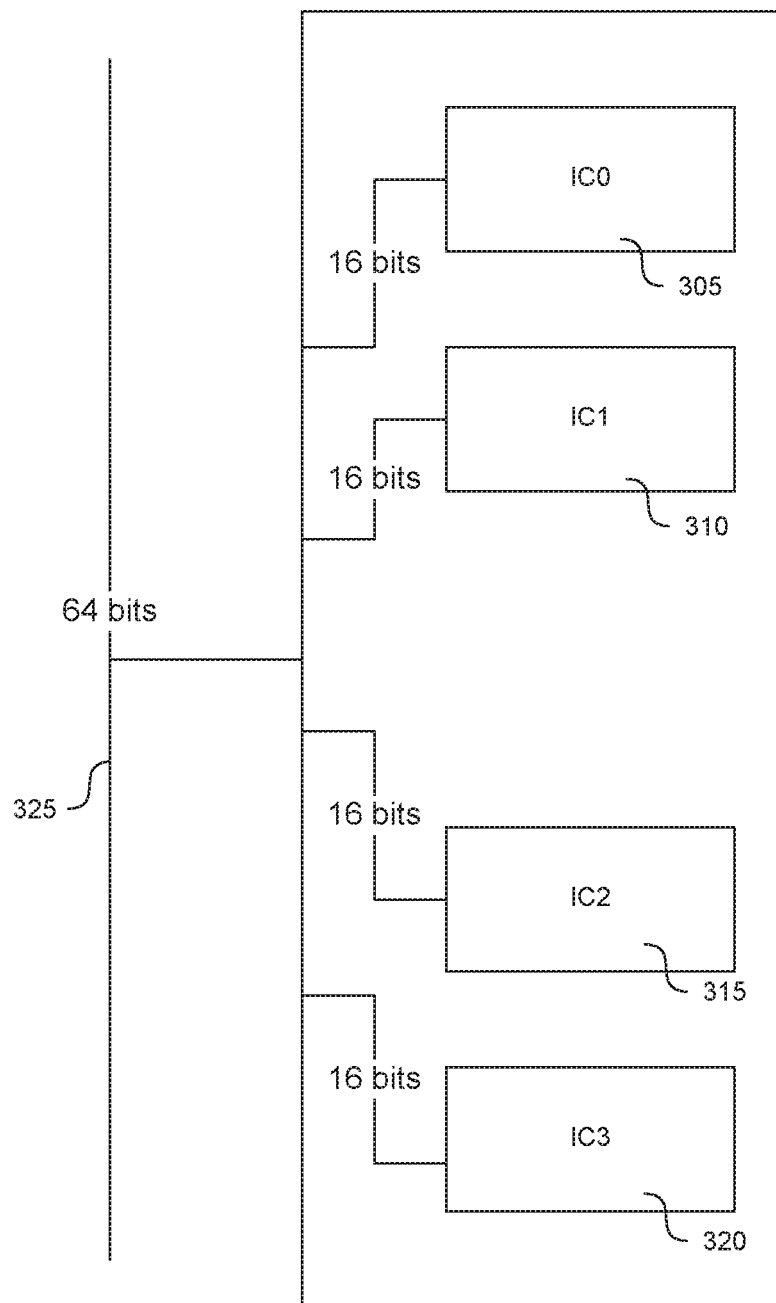
FIG. 3 is a block diagram illustrating a DIMM used in a computing system.

FIG. 3 is a block diagram illustrating a DIMM 300, such as may be used in the computing system memory topology illustrated in FIG. 2. Mounted on the DIMM are DRAM integrated circuits ("ICs") 305, 310, 315, and 320, each of which contribute to the overall memory capacity of the DIMM. For example, if a DIMM has on it mounted four DRAM ICs, each with a capacity of 512 MB, then the DIMM will have a total capacity of 2 GB. It will be appreciated that different numbers of DRAM ICs having a different capacity per IC may be used. In some embodiments the DRAM ICs contain additional capacity that is not reflected in overall DIMM capacity, which for example may be used to store error correcting codes (ECC) that protect DIMM data. The DRAM ICs are connected to DIMM interface 325, such as through a DIMM socket (not shown). As illustrated, all of the DRAM ICs concurrently read or write portions of data on the DIMM interface. For example, four DRAM ICs each reading or writing 16 bits at a time may be used to drive 64 bits of data on the DIMM interface. However, other data widths per DRAM IC, number of DRAM ICs, and DIMM socket data widths may be used. In some embodiments the DRAM ICs are designated into two or more independent sets (or "ranks"), and only one set communicates with the DIMM interface at a time (based on control information from a memory controller).

Figure 4:
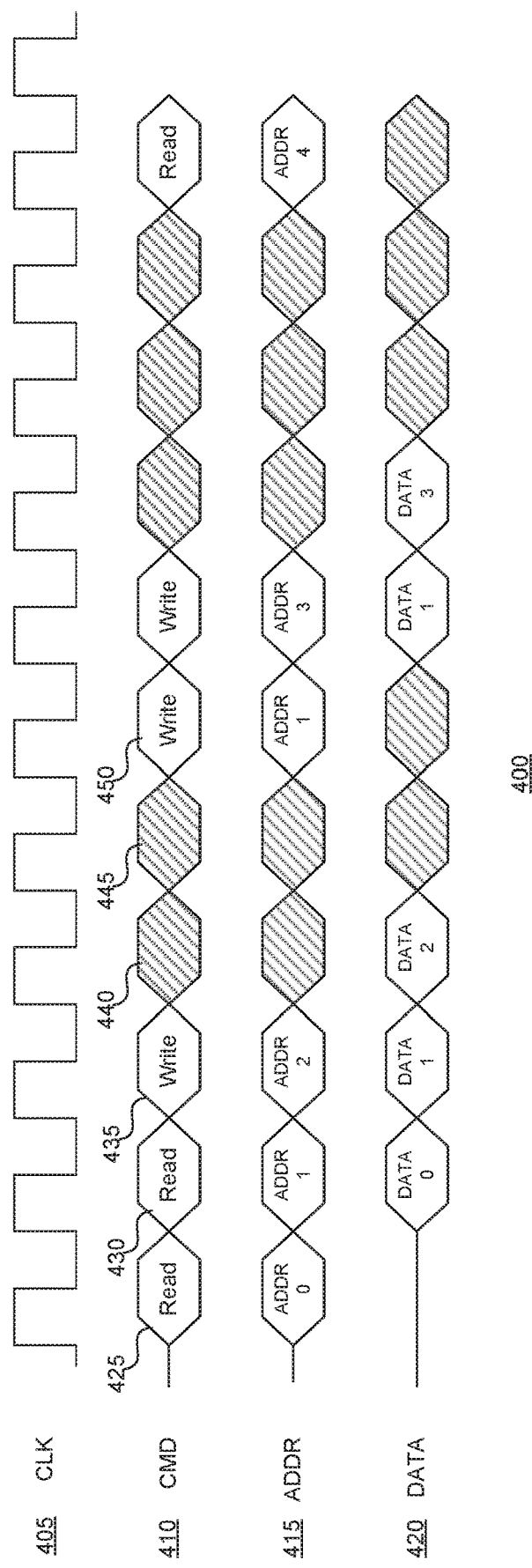
FIG. 4 is a timing diagram illustrating accesses to a DIMM in a computing system.

FIG. 4 is a timing diagram illustrating accesses 400 to a DIMM, such as the DIMM illustrated in FIG. 3. FIG. 4 is intended to be illustrative, and therefore does not include all of the control and data signals used in practiced memory interfaces. The illustrated interface for DIMM accesses includes a clock signal 405, a command bus 410, an address bus 415, and a data bus 420. In the illustrated timing diagram, the command and address busses are sampled on the rising edge of the clock, and the data bus is read or written (depending on the command) on the rising edge of the following clock cycle. It will be appreciated that in different embodiments different timings may be used. For example, in some embodiments write data is sampled on the same cycle as the write command and write address. In some embodiments, data is read or written on rising and falling edges of a clock following a memory access command (i.e., a double data rate interface is used).

In the timing diagram illustrated in FIG. 4, accesses to the DIMM utilize a single memory channel, such as may be practiced by systems that do not embody a multi-channel DIMM system. For example, at a first cycle a memory controller issues a read command 425 to the DIMM over the memory channel. The address to be read is provided on the address bus during that cycle, and the read data provided by the DIMM over the data bus on the following cycle. During the following cycle, a second read command 430 is issued by the memory controller along with the read address. Similarly, a write command 435 is issued by the memory controller on the third illustrated cycle. Following the write command, no operation commands (or "NOPs") 440 and 445 are issued on the following two cycles. NOPs may occur on the memory channel for a number of reasons. For example, memory controller hardware dedicated to the memory channel (e.g., input and output buffers) may be fully utilized by pending memory accesses, and as a result the memory controller may become stalled on that channel. Once the stall condition is resolved (e.g., the memory controller can issue additional commands on the channel), accesses to the DIMM resume, as illustrated by write command 450. Because (in the illustration of FIG. 4) the DIMM is coupled to the memory controller via a single memory channel, no accesses to the DIMM occur while the memory channel is stalled. The DIMM is therefore not utilized while the coupled memory channel is stalled.

Illustrations of Embodiments of a Multi-Channel DIMM System

Figure 5:
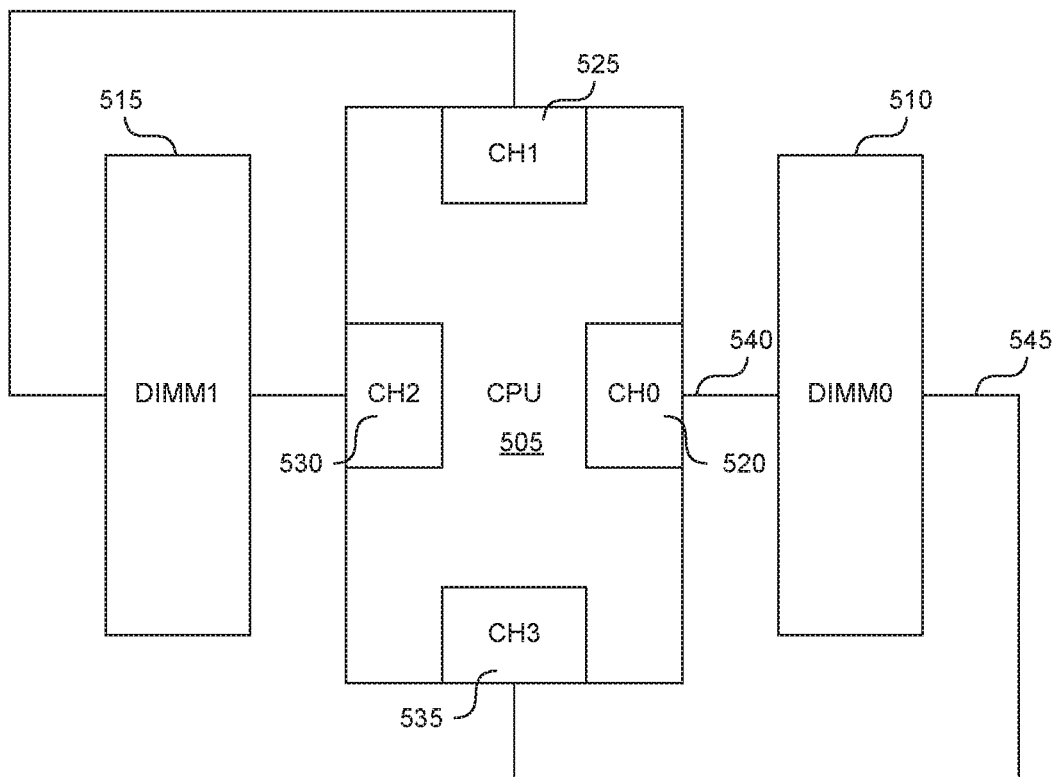
FIG. 5 is a block diagram illustrating a computing system memory topology, used in some embodiments of a multi-channel DIMM system, in which a CPU utilizes multiple memory channels to communicate which each DIMM.

FIG. 5 is a block diagram illustrating a computing system memory topology 500 implemented in some embodiments of a multi-channel DIMM system. The computing system includes a CPU 505 with integrated memory controller. The illustrated memory controller supports four memory channels 520, 525, 530, and 535, each of which operates independently of one another and can complete transactions concurrently. The system also includes DIMMs 510 and 515, which provide the system memory. Each DIMM is installed into a DIMM socket (not shown) of the computing system motherboard.

In the memory topology 500, each of the DIMMs is coupled to the memory controller via multiple memory channels. In particular, DIMM0 510 is coupled to memory channel CH0 520 and memory channel CH3 535, and DIMM1 515 is coupled to memory channel CH1 525 and memory channel CH2 530. It will be appreciated that while memory topology 500 illustrates an embodiment in which each DIMM is coupled to two memory channels, in various embodiments of the multi-channel DIMM system each of the DIMMs may be coupled to the memory controller via a different number of channels (e.g., 3, 4, 5, etc.). As described herein, by coupling a DIMM to a memory controller via multiple memory channels the multi-channel DIMM system may better utilize each installed DIMM, thereby improving the effective overall memory bandwidth of the system. For example, in the illustration of FIG. 5, if memory channel CH0 is stalled (due, for example, to too many outstanding memory transactions on that channel) then the system may utilize memory channel CH3 to perform a memory transaction with DIMM0. In contrast, if DIMM0 was coupled to the memory controller via only memory channel CH0 then when that memory channel is stalled the DIMM would be idle, thereby diminishing the effective memory bandwidth of the system.

In FIG. 5, DIMM0 510 is illustrated as being coupled to memory channel CH0 520 and memory channel CH3 535 via interconnects 540 and 545, respectively. In some embodiments of the multi-channel DIMM system, interconnects 540 and 545 are distinct physical connections. In those embodiments, for example, the interconnects are provided by distinct traces or busses on the computing system motherboard. In those embodiments, DIMM sockets and DIMMs may be modified to facilitate communication with multiple physical interconnects, either concurrently or one at a time. For example, the DIMM socket may be connected to two physical interconnects (each associated with a memory channel), but only drive one at a time to the physical interface of an unmodified DIMM (based on, for example, control information from the memory controller). As a further example, the physical interface of the DIMM may be modified to support two physical interconnects, each of which may be utilized concurrently. In some embodiments of the multi-channel DIMM system, interconnects 540 and 545 share a physical connection to the DIMM socket. In those embodiments, for example, a single set of traces or busses may connect the DIMM socket to the memory controller, and the memory controller switches whether memory channel CH0 or CH3 drive or receive data over the physical connection. The selection may occur, for example, on a cycle-by-cycle or half-cycle basis based on control information of the memory controller. In those embodiments, neither the DIMM sockets nor DIMMs need to be modified since the memory controller facilitates the use of the shared physical interface to the DIMMs by the multiple memory channels. That is, for example, a DIMM may receive memory transactions over a single physical interface, while those transactions are selectively driven by one of multiple memory channels by the memory controller.

Figure 6:
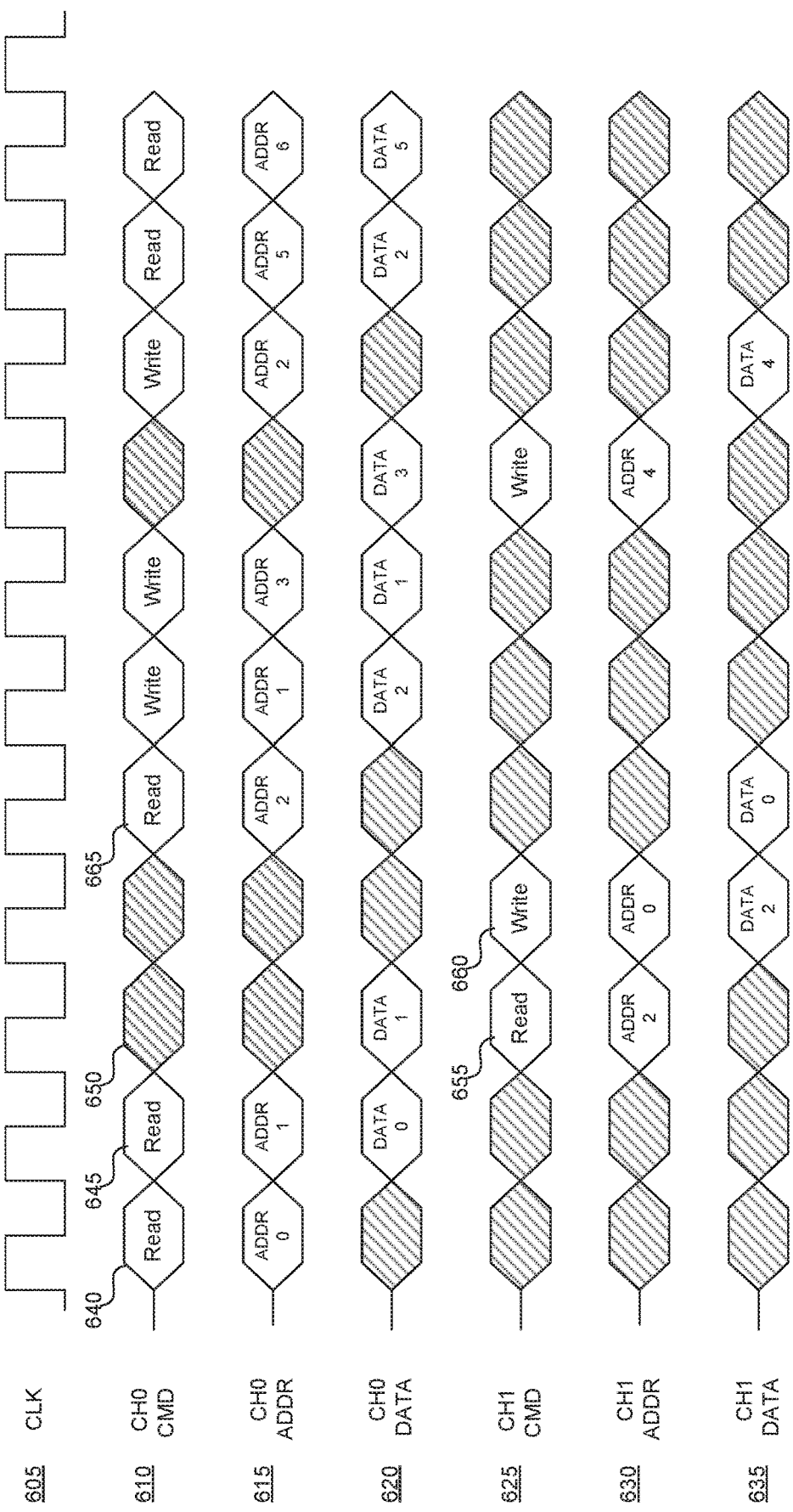
FIG. 6 is a timing diagram illustrating access to a DIMM in some embodiments of a multi-channel DIMM system.

FIG. 6 is a timing diagraming illustrating access 600 of a DIMM, such as may be practiced by embodiments of a multi-channel DIMM system. FIG. 6 is intended to be illustrative, and therefore does not include all of the control and data signals used in practiced memory interfaces. As described herein, the illustrated interface is multi-channel in that it supports multiple memory channels communicating with the DIMM. That is, the illustrated DIMM can be accessed by a memory controller over one of multiple memory channels.

The illustrated interface includes a clock signal 605, a memory channel CH0 command bus 610, a memory channel CH0 address bus 615, a memory channel CH0 data bus 620, a memory channel CH1 command bus 625, a memory channel CH1 address bus 630, and a memory channel CH1 data bus 635. In the illustrated timing diagram, the command and address busses are sampled on the rising edge of the clock, and the data bus is read or written (depending on the command) on the rising edge of the following clock cycle. It will be appreciated that in different embodiments different timings may be used. For example, in some embodiments write data is sampled on the same cycle as the write command and write address. In some embodiments, data is read or written on rising and falling edges of a clock following a memory access command (i.e., a double data rate interface is used).

In the timing diagram illustrated in FIG. 6, accesses to the DIMM utilize one of multiple memory channels. The determination of which memory channel to use, as described herein, may be made by an OS running on the computing system, firmware running on a component of the computing system (e.g., processor, memory controller, etc.), hardware logic implemented by the memory controller, etc. For example, at a first cycle a memory controller issues a read command 640 over memory channel CH0. At a second cycle the memory controller issues a read command 645 over memory channel CH0. At a third cycle the memory controller is unable to issue a memory transaction over memory channel CH0 (due, for example, to a stall condition in the memory controller for memory channel CH0) and therefore memory channel CH0 is idle (illustrated as a NOP 650). In response to the stall on memory channel CH0 (based on, for example, observed conditions related to the memory channel or predictions based on previously observed behaviors on the memory channel) however, the multi-channel DIMM system may switch to utilizing memory channel CH1 to communicate with the DIMM. Therefore, as illustrated, at the third cycle (i.e., when memory channel CH0 is stalled) the memory controller issues a read command 655 over memory channel CH1. In doing so, the DIMM is utilized during a cycle when it would otherwise be idle, and therefore the effective memory bandwidth of the computing system is improved. In the fourth cycle, the memory controller issues a write command 660 over memory channel CH1. In the fifth cycle the memory control resumes communications over memory channel CH0 (e.g., the memory controller issues read command 665), which may occur, for example, based on memory channel CH1 experiencing a stall, an end to the stall condition on memory channel CH0, a dynamic selection between available transactions on the two memory channels, a periodic switching (e.g., round robin) between available transactions on the two memory channels, etc. The multi-channel DIMM system can therefore opportunistically issue memory transactions to the DIMM from the memory controller over one of multiple memory channels.

Though FIG. 6 illustrates distinct command, address, and data busses for memory channels CH0 and CH1, in some embodiments of the multi-channel DIMM system a DIMM will only be coupled to a single interface (i.e., a single command, address, and data bus) and the multi-channel DIMM system will control the use of the single interface between the multiple memory channels. For example, in an embodiment in which a DIMM is capable of being communicatively coupled to two memory channels, the memory controller may selectively enable and disable which of the two channels can provide data to and consume data from the physical interface. That is, for example, when the multi-channel DIMM system has selected memory channel CH1 to issue memory transactions to a DIMM, the system may communicatively couple CH1 to the shared interface and decouple CH0 from the shared interface. When the system selects CH0 to issue memory transactions to the DIMM (e.g., after a half-cycle, a cycle, a fixed number of cycles, a dynamic number of cycles, etc.), CH1 is decoupled from the shared interface and CH0 is coupled to the interface. That is, the multiple memory channels that may communicate with the DIMM have the capability to be coupled to the interface, but the system ensures that only one of the memory channels is coupled to the interface at a time. In some embodiments the coupling and decoupling (e.g., multiplexing and demultiplexing) occurs within the memory controller or at the output of the memory controller, such that only a single physical interface needs to be routed to each DIMM socket on the computing system motherboard.

Figure 7:
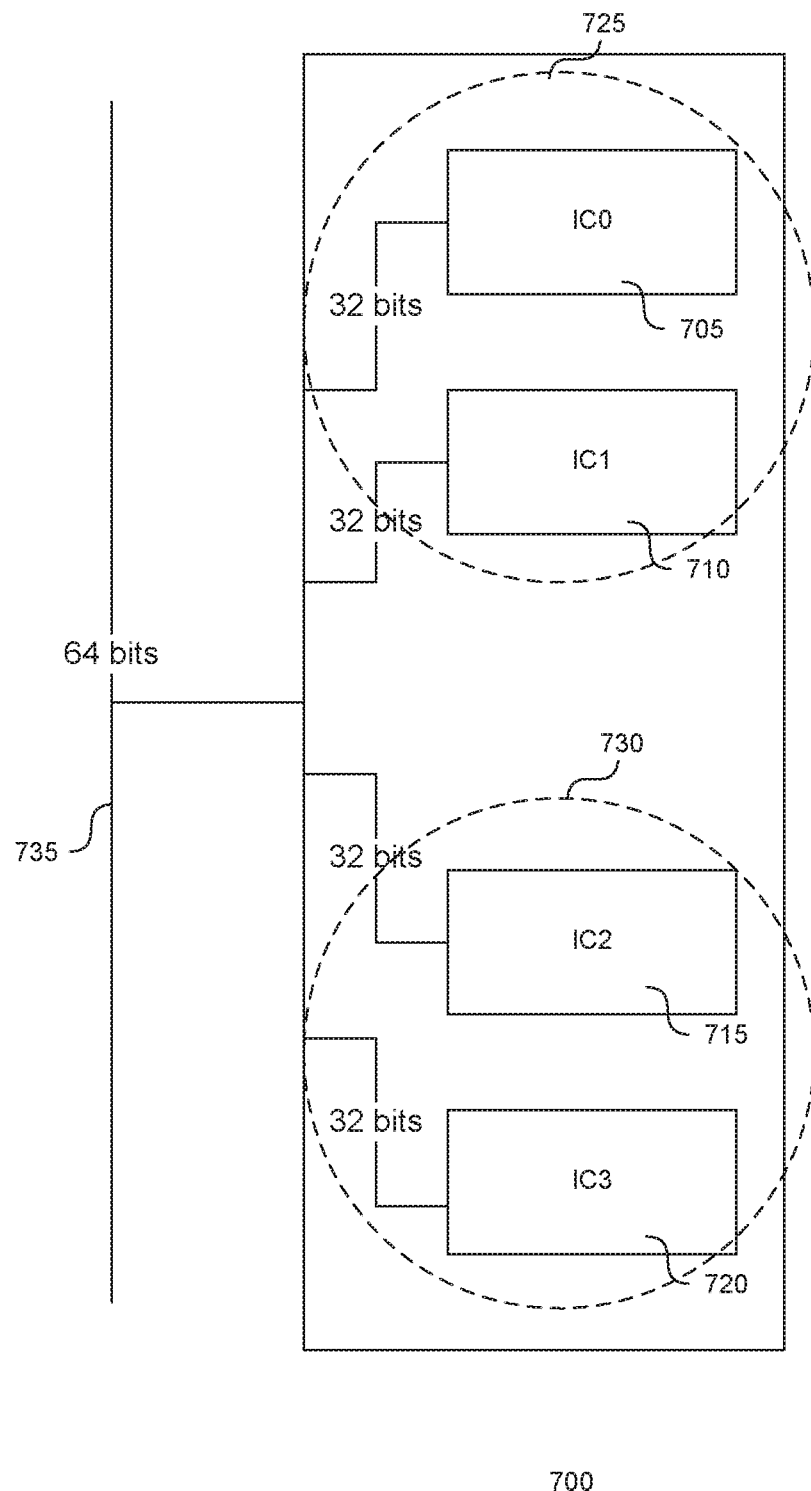
FIG. 7 is a block diagram of a DIMM used in some embodiments of a multi-channel DIMM system.

FIG. 7 is a block diagram illustrating a DIMM 700, such as may be used in some embodiments of a multi-channel DIMM system. Mounted on the DIMM are DRAM integrated circuits ("ICs") 705, 710, 715, and 720, each of which contribute to the overall memory capacity of the DIMM. For example, if a DIMM has on it mounted four DRAM ICs, each with a capacity of 512 MB, then the DIMM will have a total capacity of 2 GB. It will be appreciated that different numbers of DRAM ICs having a different capacity per IC may be used. In some embodiments the DRAM ICs contain additional capacity that is not reflected in overall DIMM capacity, which for example may be used to store error correcting codes (ECC) that protect DIMM data.

The four DRAM ICs are illustrated as being partitioned into a first partition 725 and a second partition 730, each of which is associated with a different memory channel. In some embodiments, partitioned DRAM ICs only read and write data for memory transactions on the memory channel associated with the partition. For example, DRAM ICs IC0 and IC1 may be associated with a first memory channel, and DRAM ICs IC2 and IC3 may be associated with a second memory channel. By partitioning, DRAM ICs and their capacity are each dedicated to one of the memory channels with which the DIMM communicates. In some embodiments the DRAM IC partitioning is physical (for example, the ICs are coupled to only one of multiple memory channel interfaces at the DIMM). In some embodiments the DRAM IC partitioning is performed in software (for example, the ICs are coupled to a single interface shared by multiple memory channels, as described herein, and the multi-channel DIMM system allocates different memory addresses to different memory channels, such that the DRAM ICs are utilized according to accesses to the associated addresses).

The DRAM ICs are connected to DIMM interface 735, such as through a DIMM socket (not shown). As illustrated, multiple DRAM ICs may concurrently read or write portions of data on the DIMM interface. In embodiments in which the DRAM ICs are partitioned between different memory channels, only those DRAM ICs partitioned to the memory channel may read or write data. For example, in the DIMM illustrated in FIG. 7 in which each partition includes two DRAM ICs and the DIMM interface is 64 bits, each of the DRAM ICs will have a data width of 32 bits. In various embodiments of the multi-channel DIMM system, other data widths per DRAM IC, number of DRAM ICs per DIMM, number of DRAM ICs per partition, and DIMM socket data widths may be used.

Flows for a Multi-Channel DIMM System

Figure 8:
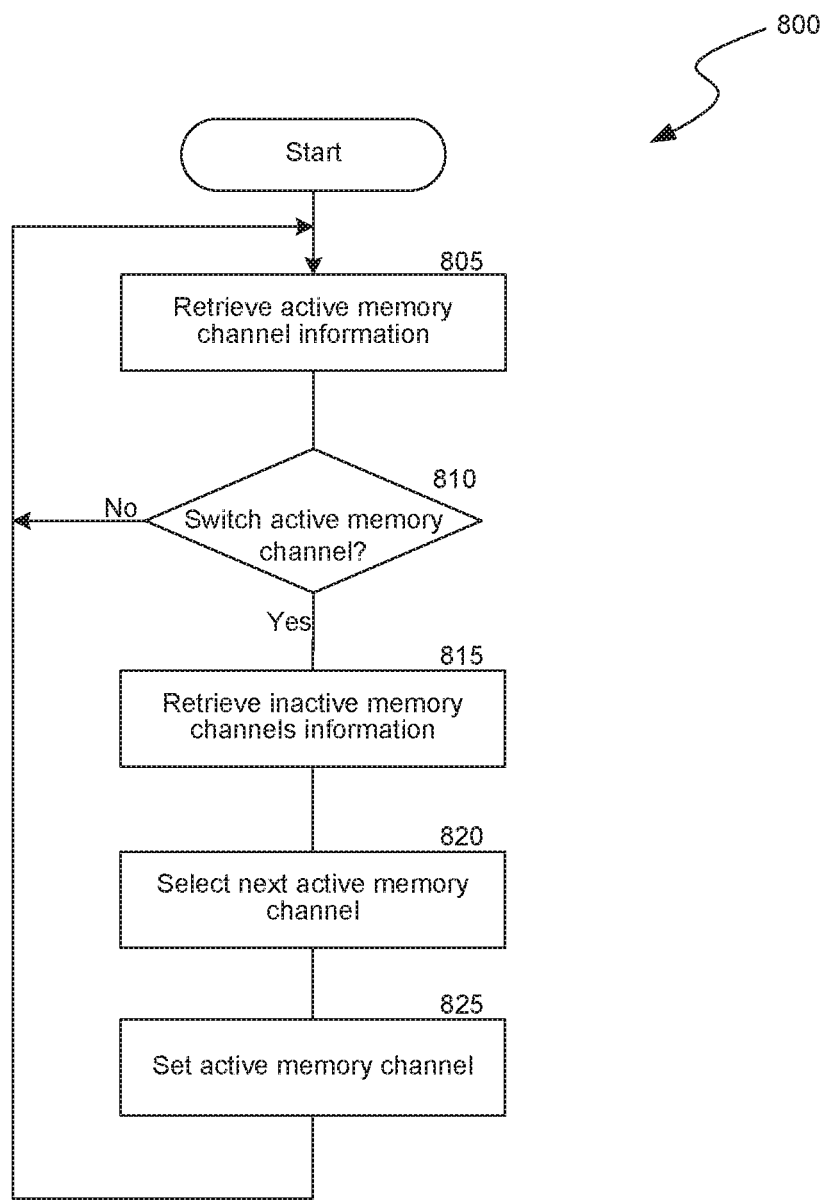
FIG. 8 is a flow diagram illustrating a process, used in some embodiments of a multi-channel DIMM system, for performing multi-channel memory accesses.

FIG. 8 is a flowchart illustrating an example process 800, implemented by a multi-channel DIMM system, for selecting a memory channel (from multiple memory channels) by which to communicate with a DIMM. The process may be performed by the system periodically (e.g., every half-cycle, every clock cycle, every n clock cycles, etc.) or dynamically (e.g., upon detecting a stall condition on a memory channel). Steps of the process may be performed, for example, in kernel-level OS software of the system, by system firmware, by dedicated logic of a memory controller in the system, etc. By evaluating (either periodically or dynamically) the state of the multiple memory channels that may be used to communicate with a DIMM, and selecting one for use, the multi-channel DIMM system can utilize one of multiple memory channels, thereby improving utilization of the DIMM. By improving DIMM utilization (i.e., avoid cycles where the DIMM is idle due to no memory transactions), overall memory bandwidth is improved over systems in which the DIMM is accessible via only a single memory channel.

At a block 805, the system retrieves information characterizing the active memory channel. The active memory channel may be, for example, the memory channel from the multiple memory channels that is currently communicating with the DIMM. As a further example, the active memory channel may be the last memory channel, from the multiple memory channels over which the DIMM may communicate, to have been used to communicate with the DIMM. Information characterizing the active channel may include the fill levels of buffers associated with the memory channel (e.g., input and output buffers of the memory controller), such as the current fill level of the buffers as well as fill levels from previous cycles (e.g., the last 5 cycles, the last 20 cycles, the last 100 cycles). Information characterizing the active memory channel may additionally include the number of consecutive cycles for which the memory channel has been the active channel (e.g., whether this is the first cycle the memory channel has been the active memory channel, whether the memory channel has been the active memory channel for the last 3 cycles, etc.), Information characterizing the active memory channel may additionally include a record of the most recent memory transactions over that memory channel (e.g., the addresses and commands of the last n transactions issued to the DIMM via the channel). It will be appreciated that other characteristics of the memory channel, indicative of memory channel access patterns or the ability of the memory channel to continue to issue transactions, may be used by the system.

At a decision block 810, the system determines whether to switch which of the multiple memory channels is utilized as the active memory channel based on the retrieved information characterizing the current active memory channel. For example, the system may determine to switch which memory channel is used if the active memory channel is at or near stall (based on, for example, one of the associated buffers being filled or nearly filled). As a further example, the system may determine to switch which memory channel is used if the active memory channel has been the active channel for a number of consecutive cycles exceeding a threshold (e.g., more than 10 consecutive cycles). As a further example, the system may determine to switch which memory channel to use based on the most recent transactions over the memory channel (e.g., whether there has been a burst of transactions over the channel, based on the patterns of memory addresses accessed, etc.). If it is determined not to switch the memory channel to utilize as the active memory channel, then the current active memory channel remains the active memory channel and the process returns to block 805. If it is determined that the memory channel used as the active memory channel should be switched, then the process continues to a block 815.

At the block 815, the system retrieves information characterizing the other memory channels that may be used to communicate with the DIMM (i.e., the "inactive memory channels"). Information characterizing the inactive memory channels may include the fill rate of buffers associated with the memory channels, whether there are any pending transactions that can be issued over any of the memory channels, how many cycles it has been since each of the memory channels was the active memory channel, etc.

At a block 820, the system selects an inactive memory channel to be used as the next active memory channel. The selection may be based on, for example, which inactive memory channels are eligible for handling any pending memory transactions. The selection may additionally be based on the available capacity of the buffers associated with the inactive memory channels. The selection may be further based on which of the inactive memory channels have not been used in the greatest number of cycles. It will be appreciated that combinations of factors may be used in determining which inactive memory channel to select.

At a block 825, the system sets the selected memory channel as the active memory channel. By setting the selected memory channel as active, memory transactions between the memory controller and the DIMM will utilize the selected memory channel until a different memory channel is designated as the active channel. In some embodiments, setting a memory channel as active may include controlling hardware (e.g., multiplexors, de-multiplexors, state) within the memory controller or on the motherboard. For example, in embodiments in which multiple memory channels share a physical interface to the DIMM, the system may be configured so that only the active memory channel interface of the memory controller can read from or write to the shared interface. After the selected memory channel is set as active, processing returns to block 805 so that the system may continue to monitor the state of the active memory channel and evaluate whether to switch which of the multiple memory channels is used as the active memory channel for communicating with the DIMM.

CONCLUSION

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer-implemented method comprising:
retrieving information characterizing a plurality of memory channels, wherein:
the plurality of memory channels comprises:
a first channel that is currently designated as an active memory channel configured to receive new memory transactions issued by a memory controller; and
a second channel;
each of the plurality of memory channels comprises a memory-controller buffer;
each of the plurality of memory channels is configurable to facilitate memory transactions between the memory controller and a memory module; and
each of the plurality of memory channels has previously been designated as the active memory channel;
determining, based on the information, whether to designate a new active memory channel;
responsive to the determination, selecting, based on the information, the second channel to replace the first channel as the active memory channel; and
designating the second channel as the active memory channel in place of the first channel.

2. The method of claim 1, wherein:
the plurality of memory channels share a physical connection to the memory module; and
designating the second channel as the active memory channel comprises configuring the second channel for exclusive use of the shared physical connection.

3. The method of claim 1, wherein determining whether to designate a new active memory channel is based on whether a number of clock cycles the first channel has been active exceeds a threshold number of clock cycles.

4. The method of claim 1, wherein:
the information comprises, for each of the plurality of memory channels, a fill level of the memory-controller buffer of the memory channel; and
determining whether to designate a new active memory channel is based on the fill level of the memory-controller buffer of the first channel.

5. The method of claim 1, wherein:
the information comprises, for each of the plurality of memory channels, a number of cycles since the memory channel was last the active memory channel; and
the selection of the second channel to replace the first channel as the active memory channel is based on the second channel having the greatest number of cycles since last being the active memory channel.

6. The method of claim 1, wherein:
the information comprises, for each of the plurality of memory channels, a fill level of the memory-controller buffer of the memory channel; and
the selection of the second channel to replace the first channel as the active memory channel is based on the memory-controller buffer of the second channel having the lowest fill level.

7. The method of claim 1, wherein:
the information comprises, for each of the plurality of memory channels, a fill rate of the memory-controller buffer of the memory channel; and
the selection of the second channel to replace the first channel as the active memory channel is based on the memory-controller buffer of the second channel having the lowest fill rate.

8. The method of claim 1, wherein:
the information comprises, for each of the plurality of memory channels, a number of pending memory transactions held by the memory-controller buffer of the memory channel; and
the selection of the second channel to replace the first channel as the active memory channel is based on the memory-controller buffer of the second channel holding the lowest number of pending memory transactions.

9. The method of claim 1, wherein at most one of the plurality of memory channels is designated as the active memory channel at a time.

10. The method of claim 1, wherein designating the second channel as the active memory channel comprises configuring the memory controller to use the second channel for communication with the memory module.

11. The method of claim 1, wherein the memory-controller buffer of each of the plurality of memory channels is an input buffer holding commands received from the memory controller.

12. The method of claim 1, wherein the memory-controller buffer of each of the plurality of memory channels is an output buffer holding data received from the memory module.

13. A system comprising:
a memory module configured to:
store data received at a memory-module interface; and
provide data to the memory-module interface in response to memory requests received at the memory-module interface;
a memory controller configured to issue memory transactions to the memory module via a plurality of memory channels;
the plurality of memory channels comprising at least a first channel that is currently designated as an active memory channel configured to receive new memory transactions issued by the memory controller and a second channel, wherein:
each of the plurality of memory channels comprises a memory-controller buffer;
each of the plurality of memory channels is configured to facilitate, via the memory-module interface, memory transactions between the memory controller and the memory module; and
each of the plurality of memory channels has previously been designated as the active memory channel; and
a channel manager configured to:
retrieve information characterizing the plurality of memory channels;
determine, based on the information, whether to designate a new active memory channel;
responsive to the determination, select, based on the information, the second channel to replace the first channel as the active memory channel; and
designate the second channel as the active memory channel in place of the first channel.

14. The system of claim 13 further comprising a clock signal, where the determination of whether to designate a new active memory channel occurs every cycle of the clock signal.

15. The system of claim 13, wherein:
the channel manager is further configured to determine a number of clock cycles the first channel has been the active memory channel;
the determination of whether to designate a new active memory channel is based on whether the number of clock cycles the first channel has been active exceeds a threshold number of clock cycles.

16. The system of claim 13, wherein:
the information comprises, for each of the plurality of memory channels, a fill level of the memory-controller buffer of the memory channel; and
the channel manager determines whether to designate a new active memory channel based on the fill level of the memory-controller buffer of the first channel.

17. The system of claim 13, wherein:
the information comprises, for each of the plurality of memory channels, a number of cycles since the memory channel was last the active memory channel; and
the channel manager is configured to select the second channel to replace the first channel as the active memory channel based on the second channel having the greatest number of cycles since last being the active memory channel.

18. The system of claim 13, wherein:
the information comprises, for each of the plurality of memory channels, a fill level of the memory-controller buffer of the memory channel; and
the channel manager is configured to select the second channel to replace the first channel as the active memory channel based on the memory-controller buffer of the second channel having the lowest fill level.

19. The system of claim 13, wherein:
the information comprises, for each of the plurality of memory channels, a fill rate of the memory-controller buffer of the memory channel; and
the channel manager is configured to select the second channel to replace the first channel as the active memory channel based on the memory-controller buffer of the second channel having the lowest fill rate.

20. A non-transitory computer-readable medium comprising one or more computer-executable instructions that, when executed by at least one processor of a computing device, cause the computing device to:
retrieve information characterizing a plurality of memory channels, wherein:
the plurality of memory channels comprises:

a first channel that is currently designated as an active memory channel configured to receive new memory transactions issued by a memory controller; and a second channel;

each of the plurality of memory channels comprises a memory-controller buffer;

each of the plurality of memory channels is configurable to facilitate memory transactions between the memory controller and a memory module; and each of the plurality of memory channels has previously been designated as the active memory channel;

determine, based on the information, whether to designate a new active memory channel;

responsive to the determination, select, based on the information, the second channel to replace the first channel as the active memory channel; and designate the second channel as the active memory channel in place of the first channel.

* * * * *